United States Patent [19]

Tauscher et al.

[11] Patent Number: 4,692,030
[45] Date of Patent: Sep. 8, 1987

[54] STATIC MIXING DEVICE FOR VISCOUS MELTS

[75] Inventors: Willy Tauscher, Winterthur; Gottlieb Schneider, Seuzach, both of Switzerland

[73] Assignee: Sulzer Brothers Limited, Winterthur, Switzerland

[21] Appl. No.: 707,230

[22] Filed: Mar. 1, 1985

[30] Foreign Application Priority Data

Mar. 5, 1984 [CH] Switzerland ............... 1070/84

[51] Int. Cl.⁴ .................... B01F 5/06; B29B 1/06
[52] U.S. Cl. ........................ 366/337; 138/38; 366/336
[58] Field of Search ............... 366/336–340, 366/341; 138/38, 42; 48/180 R, 180 B

[56] References Cited

U.S. PATENT DOCUMENTS

| 4,093,188 | 6/1978 | Horner | 366/336 |
| 4,198,168 | 4/1980 | Penn | 366/336 |
| 4,220,416 | 9/1980 | Brauner et al. | 366/337 |
| 4,352,378 | 10/1982 | Bergmann et al. | 366/337 X |
| 4,464,057 | 8/1984 | Durrieu et al. | 366/337 X |
| 4,497,752 | 2/1985 | Huber | 366/337 X |

FOREIGN PATENT DOCUMENTS 8202004  6/1982  PCT Int'l Appl. ............ 366/337

Primary Examiner—Timothy F. Simone
Attorney, Agent, or Firm—Kenyon & Kenyon

[57] ABSTRACT

The static mixing device includes a tubular casing and at least one mixing element composed of individual webs which are secured in the wall of the casing. The webs are disposed in crossing relation to each other with a transverse spacing therebetween. The terminal ends of each web are secured within the wall of the casing by being shrink-fitted, soldered, welded or threaded.

13 Claims, 8 Drawing Figures

STATIC MIXING DEVICE FOR VISCOUS MELTS

This invention relates to a static mixing device. More particularly, this invention relates to a static mixing device for highly viscous melts.

As is known, plastic machinery, such as injection moulding machines or extruders, are constructed with a feed screw for feeding a plastic melt through a die or the like downstream of the feed screw. However, it is a frequent occurrence that the plastic melt has certain inhomogeneities downstream of the feed screw, for example of temperature and/or additives, such as color, UV stabilizers or fire proofing agents. Thus, in order to obviate such inhomogeneity characteristics, static mixers have been employed downstream of the feed screw for such plastic melts as polystyrene, polythene (polyethylene), polypropylene and the like.

One known static mixing device for use in the above is known from Swiss Pat. No. 615,113. In this case, the static mixing device is constructed of crossing webs which are interconnected by a central bar while the contours of the webs or web ends adjacent the wall of a casing in which the static mixing device is placed are adapted to the casing wall. That is, the web ends engage flush against the casing wall and may, for example be welded to the wall.

However, mixers of the above type are not suitable for highly viscous plastic melts such as polyvinyl chloride (PVC), high molecular weight polythene, polyacrylonitrile and synthetic and natural rubber melts, for several reasons.

First, the pressure drop of the static mixing device is excessive in the case of such melts. As a result there may be an excessive build-up of pressure at the feedscrew apex. Therefore, the energy consumption of the machines processing the melts may be excessive, while throughput may be reduced. There may also be mechanical destruction of the known mixers.

Second, excessive pressure drops also lead to excessive local overheating and to excessive shear forces. Therefore, in the case of thermally unstable and/or shear-sensitive high viscosity melts, this may lead to damage to the end product.

The dwell time range of static mixers is, of course, narrow. Nevertheless, there are still critical points in the known mixers, for instance, in the contact areas of crossing webs or at welds, for instance, between webs and the casing inner wall, where small quantities of melt may stick and build up.

An excessive dwell at such places may also lead to end product impairment.

Accordingly, it is an object of the invention to provide a static mixing device for highly viscous melts which can provide satisfactory mixing.

It is another object of the invention to provide a relatively simply static mixing device for reducing inhomogeneities in highly viscous melts within an extruder or diecasting machine.

It is another object of the invention to provide a static mixing device having a streamline shape as well as a high mechanical strength.

It is another object of the invention to provide a static mixing device which can be used for mixing a highly viscous melt within a tolerable pressure drop.

Briefly, the invention provides a static mixing device which is comprised of a tubular casing having a wall disposed along a longitudinal axis and at least one mixing element disposed in the casing where the mixing element includes at least two webs disposed in crossing relation to each other and at an inclination to the longitudinal axis. In accordance with the invention, each web has a pair of terminal ends secured within the casing wall and the webs are transversely spaced from each other to define a clear space therebetween. The mixing element is particularly useful with plastic melts of high viscosities of, for example, 3000 and more Pa s (Pascal seconds).

The webs of the mixing element may be arranged in various manners. For example, in one embodiment, the webs may be arranged in two groups with the webs of one group crossing the webs of the other group and with the webs in each group being disposed in coplanar relation.

In another embodiment, the webs may again be disposed in two groups with the webs of one group crossing the webs of the other group and with the webs in at least one group being disposed in staggered relation along the longitudinal axis of the casing, for example in the manner of a staircase.

The mixing element may also include at least three webs disposed in crossing relation helically along the longitudinal axis of the casing.

In still another embodiment, the webs of a mixing element may be disposed so that the terminal ends are in a helical array. Such mixing elements may also be disposed in the casing in longitudinally spaced relation with the webs of adjacent mixing elements disposed in opposite hand relation to each other.

In still another embodiment, a number of mixing elements may be disposed along the longitudinal axis of the casing with each mixing element comprised of a number of fitments formed from two groups. In this case, the fitments are disposed along the axis of the casing and are displaced one into another so that the webs of one fitment extend into the space of the contiguous fitments so that the crossings of webs of adjacent fitments arise and the end parts of such webs are secured in a part of the casing wall of an adjacent fitment.

The casing can be a cylindrical tube or of any other suitable cross sectional shape, for example square.

In addition, the casing may be made of steel and may be formed with apertures of appropriate cross-section to receive the terminal ends of the webs of the mixing elements. For example, the apertures may be drilled out or milled out in accordance with the cross section of the terminal ends.

The shaping of the mixing elements is such that a melt can flow through the clear spaces between the crossing webs and along the inner wall of the casing without hinderance. The reason for this is that, in contrast to known mixers, the working medium cannot stick at the crossing places between the webs of the mixing element and at the web wall junctions. Thus, dead zones cannot form.

The webs and the terminal ends may be produced, for example by casting or by milling. Further, the webs may be of strip-like or of rectangular cross section between the terminal ends. Alternatively, the webs may have any other suitable streamlined shape, for example a circular or elliptical cross sectional shape.

The webs need not necessarily all be of the same shape and dimension as one another. Nor is it essential for each individual web to be of the same shape and dimension over its length. If required, the webs including their terminal ends can be hollow so that a cooling or heating agent can flow through them.

In one possible embodiment, the crossing of a number of webs are disposed outside the mixing tube.

A mixer according to the invention is intended for use more particularly with highly viscous media such as plastics melts. However, due to the unhindered discharge at the web crossings and at the smooth junctions between the webs and the casing wall, the mixer may be of use, for example, with liquid or gaseous agents containing solids, such as plastics melts containing fibers and loading agents or foods, such as syrupy juices containing fibers, skins or pieces of fruit.

These and other objects and advantages of the invention will become more apparent from the following detailed description taken in conjunction with the accompanying drawings wherein.

Figure 1:
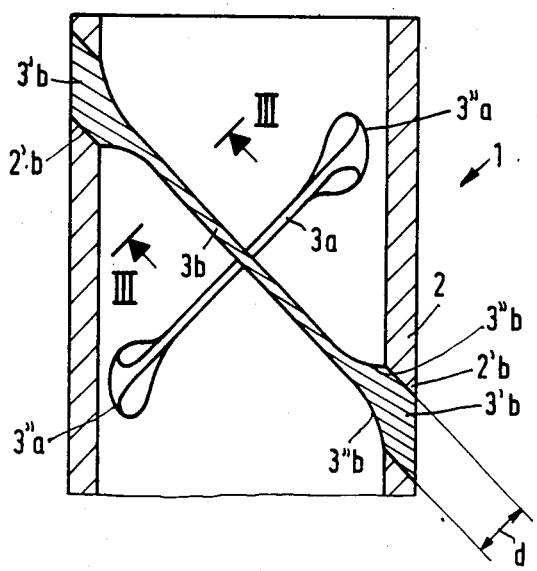
FIG. 1 illustrates a longitudinal sectional view taken on line I—I of FIG. 2 of a static mixing device constructed in accordance with the invention.
Figure 2:
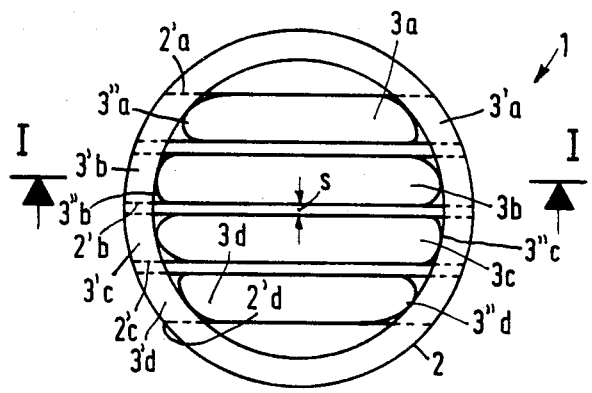
FIG. 2 illustrates a plan view of the static mixing device of FIG. 1.

Referring to FIGS. 1 and 2, the static mixing device 1 is comprised of a tubular cylindrical casing 2 which has a wall disposed along a longitudinal axis as well as at least one mixing element in the casing 2. As indicated, the mixing element is disposed across the cross-section of the casing 2 in the form of four webs $3a$–$3d$.

Each web $3a$–$3d$ has a pair of terminal ends $3'a$–$3'd$, each of which has a circular cylindrical cross-section of a diameter d. Each web is also of rectangular cross-section between the terminal ends.

As indicated in FIG. 1, each terminal end $3'a$–$3'd$ of a web extends into and through the wall of the casing 2 within a bore $2'a$–$2'd$ which is also of the same diameter d.

In order to secure each terminal end of a web in the casing 2, the terminal ends may be shrink-fitted in the wall of the casing 2. Alternatively, each terminal end may be soldered or welded to the casing wall from the outside. Still further, each terminal end may be threaded into the casing wall. In this case, each bore of the casing would be threaded in suitable manner.

As indicated in FIG. 1, the intermediate parts of each web merge into the terminal ends by way of transition edges $3''a$–$3''d$ so that a smooth surface is presented.

Referring to FIGS. 1 and 2, the webs $3a$–$3d$ are disposed in crossing relation to each other as well as an inclination to the longitudinal axis of the casing 2. In addition, the webs are transversely spaced from each other to define a clear space s therebetween and, particularly, at the crossing places and at the places adjacent the casing wall.

During use, a highly viscous material, such as a plastic melt, flows through the casing from an inlet end. Upon reaching a mixing device, the melt passes over and around each web while flowing through the spaces s where the webs cross as well as along the casing wall without hindrance.

Figure 3:
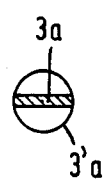
FIG. 3 illustrates a view taken on line III—III of FIG. 1.

As indicated in FIG. 3, the webs are strip-like between the terminal ends $3'a$.

Figure 4:
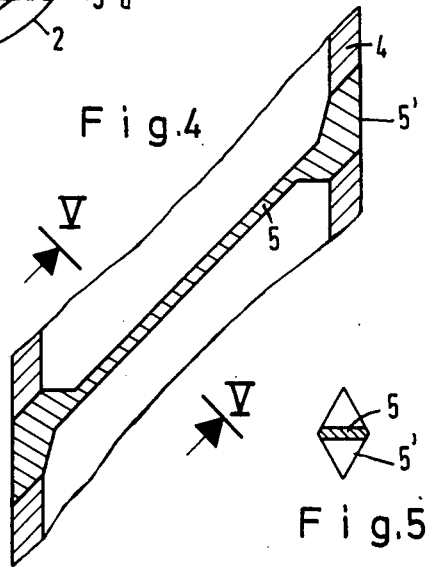
FIG. 4 illustrates a longitudinal sectional view of a web of a mixing element constructed in accordance with the invention.
Figure 5:
FIG. 5 illustrates a view taken on line V—V of FIG. 4.

Referring to FIGS. 4 and 5, the mixing elements may be constructed with webs 5 which have diamond-shaped terminal ends 5' which fit into like bores in the wall of a cylindrical casing 4.

Figure 6:
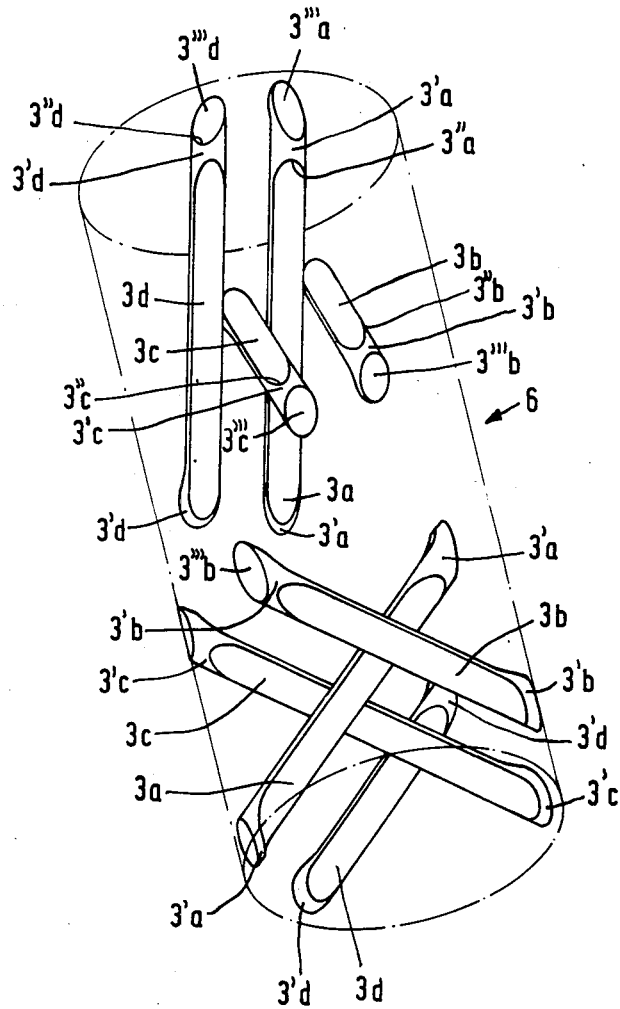
FIG. 6 illustrates a perspective view of the webs of two mixing elements in a single casing of tubular shape in accordance with the invention.

Referring to FIG. 6, the mixer may have a tubular casing with a circular cross section as indicated in chain-dotted lines as well as two mixing elements. In this case, each mixing element is formed of four strip-like webs $3a$–$3d$ having cylindrical terminal ends $3'a$–$3'd$, as above. In addition, the mixing elements are angularly offset to each other along the longitudinal axis of the casing, for example being offset by 90°. As indicated, the terminal ends $3'a$–$3'd$ have end faces $3'''a$–$3'''d$ on the outside of the casing.

Figure 7:
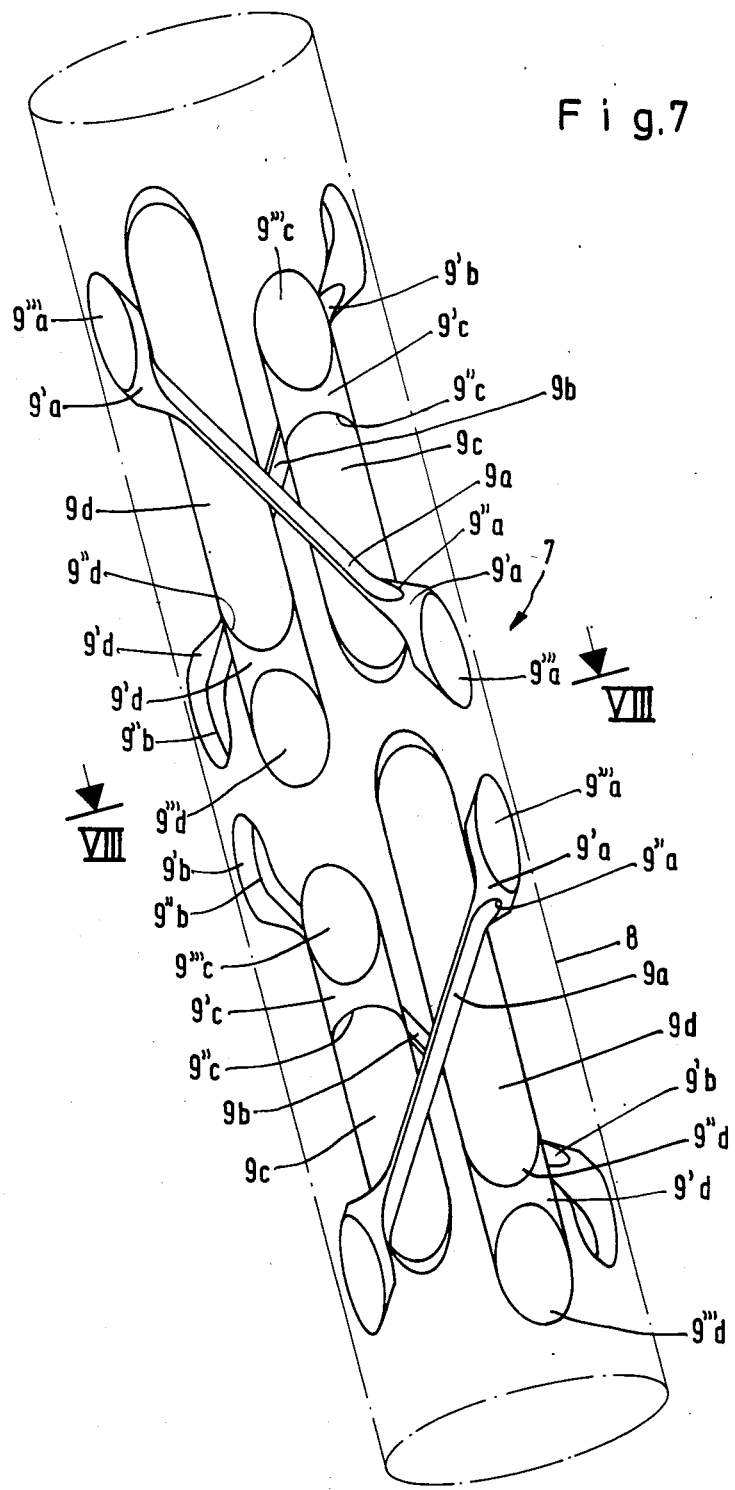
FIG. 7 illustrates a modified pair of mixing elements in accordance with the invention.
Figure 8:
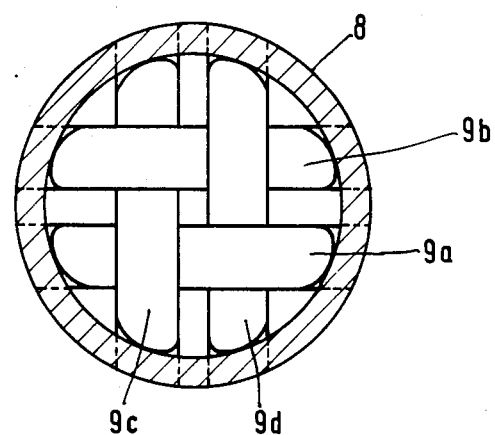
FIG. 8 illustrates a view taken on line VIII—VIII of FIG. 7.

Referring to FIGS. 7 and 8, the static mixer may alternatively be constructed of a cylindrical casing 8 which has two mixing elements disposed in consecutive spaced apart relationship along the axis of the casing wherein each mixing element has four crossing webs $9a$–$9d$. In this embodiment, the webs $9a$–$9d$ of each mixing element are disposed with the terminal ends $9'a$–$9'd$ in a helical array and in opposite hand to the webs of the other mixing element. Thus, the webs $9a$–$9d$ are tilted relative to one another so as to induce a cross-flow as well as a rotary flow of a viscous medium passing therethrough.

As above, the webs have transition edges $9''a$–$9''d$ which merge the intermediate parts of the webs into the circular terminal ends $9'a$–$9'd$ while the end faces $9''a$–$9''d$ of each web are on the outside of the casing.

The invention thus provides a static mixing device with a mixing element which can be used for highly viscous materials such as plastic melts, e.g. polyvinyl chloride.

Further, the invention provides a mixing element wherein the individual webs constituting the mixing element can be mounted with a tubular casing without creating sharp corners or places where dead zones may occur within a medium flowing through the static mixer.

The invention further provides a static mixing device wherein the mixing elements may have webs of streamline shape for the flow of a viscous medium thereover. In addition, each web may have a terminal end of suitable shape to be fitted into the wall of the casing and secured thereto. To this end, the terminal end of each web may be of circular cross-section, elliptical cross section, diamond-shaped section, or drop-shaped cross section.

The invention further provides a static mixing device which is stable to highly viscous plastic melts, which does not clog, and which enables the melt to discharge freely between the webs and along the inner wall of the casing.

What is claimed is:

1. A static mixing device for a viscous material comprising a tubular casing having a wall disposed along a longitudinal axis to define a flow path for the viscous material; and at least one mixing element disposed in and across said casing in said flow path, said mixing element including at least two webs disposed in crossing relation to each other and at an inclination to said longitudinal axis, each said web having a pair of terminal ends secured within said casing wall, said webs being transversely spaced from each other to define a space therebetween for passage of viscous material therethrough without hindrance.

2. A static mixing device as set forth in claim 1 wherein said mixer element includes at least two groups of said webs, the webs of one group crossing the webs of the other group and the webs in at least one group being disposed in coplanar relation.

3. A static mixing device as set forth in claim 1 further comprising at least two mixing elements disposed along said longitudinal axis and in angularly offset relation to each other.

4. A static mixing device as set forth in claim 1 wherein each terminal end is of circular cross-section.

5. A static mixing device as set forth in claim 1 wherein each terminal end is of elliptical cross-section.

6. A static mixing device as set forth in claim 1 wherein each terminal end is of diamond-shaped cross-section.

7. A static mixing device as set forth in claim 1 wherein each terminal end is of drop-shaped cross-section.

8. A static mixing device as set forth in claim 1 wherein each web is of rectangular cross-section between said terminal ends.

9. A static mixing device for highly viscous melts comprising
a tubular casing having a wall disposed along a longitudinal axis for a flow of a highly viscous melts therethrough; and
a plurality of webs extending within and across said casing within a common cross-section of said casing for mixing of the melt passing thereover, at least one of said webs having a pair of terminal ends secured within said wall of said casing and at least two of said webs being disposed in spaced apart crossing relation to each other transversely of said axis to permit a flow of melt therebetween.

10. A static mixing device as set forth in claim 9 wherein said webs are disposed in two coplanar groups with each group in crossing relation to the other group.

11. A static mixing device as set forth in claim 9 wherein said webs define at least two longitudinally spaced mixing elements.

12. A static mixing device as set forth in claim 11 wherein said webs of each mixing element are disposed with the terminal ends in a helical array and in opposite hand to said webs of the other mixing element.

13. A static mixing device as set forth in claim 11 wherein said mixing elements are angularly offset to each other along said axis.

* * * * *

UNITED STATES PATENT AND TRADEMARK OFFICE
CERTIFICATE OF CORRECTION

PATENT NO. : 4,692,030

DATED : September 8, 1987

INVENTOR(S) : Willy Tauscher, et al

It is certified that error appears in the above-identified patent and that said Letters Patent is hereby corrected as shown below:

Column 1, line 57 "simply" should be -simple-
Column 3, line 3 "crossing" should be -crossings-
Column 6, line 7 "melts" should be -melt- Signed and Sealed this Fifth Day of April, 1988

Attest:

DONALD J. QUIGG

Attesting Officer

Commissioner of Patents and Trademarks